United States Patent
Lee et al.

(10) Patent No.: US 9,621,738 B2
(45) Date of Patent: Apr. 11, 2017

(54) METHOD AND APPARATUS FOR CONTROLLING CHARGING BY USING VOLUME INFORMATION OF DATA

(71) Applicant: Samsung Electronics Co., Ltd., Gyeonggi-do (KR)

(72) Inventors: Hyungho Lee, Seoul (KR); Jicheol Lee, Gyeonggi-do (KR)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 107 days.

(21) Appl. No.: 14/204,925

(22) Filed: Mar. 11, 2014

(65) Prior Publication Data
US 2014/0254481 A1 Sep. 11, 2014

(30) Foreign Application Priority Data
Mar. 11, 2013 (KR) ........................ 10-2013-0025732

(51) Int. Cl.
*H04L 12/14* (2006.01)
*H04M 15/00* (2006.01)

(52) U.S. Cl.
CPC ........ *H04M 15/82* (2013.01); *H04L 12/1407* (2013.01); *H04L 12/1435* (2013.01); *H04M 15/66* (2013.01)

(58) Field of Classification Search
None
See application file for complete search history.

(56) References Cited

U.S. PATENT DOCUMENTS

| | | | | |
|---|---|---|---|---|
| 2009/0141625 A1* | 6/2009 | Ghai | ................... | H04L 12/5695 370/230 |
| 2011/0202634 A1* | 8/2011 | Kovvali | .................. | H04L 12/14 709/219 |
| 2012/0060198 A1* | 3/2012 | Tremblay | ............ | H04L 12/1407 726/1 |
| 2012/0220330 A1* | 8/2012 | Goldner | .............. | H04L 12/1407 455/517 |

(Continued)

FOREIGN PATENT DOCUMENTS

| WO | WO 2012/139016 A2 | 10/2012 |
|---|---|---|
| WO | WO 2012/140135 A1 | 10/2012 |

OTHER PUBLICATIONS

Extended European Search Report dated Jun. 3, 2014 in connection with International Patent Application No. 14158816.0-1862, 10 pages.

*Primary Examiner* — Hassan Kizou
*Assistant Examiner* — Hashim Bhatti

(57) ABSTRACT

The present disclosure relates to a method and an apparatus for controlling charging by using volume information of data, and more particularly, to a method and an apparatus for controlling charging for a UE by using volume information of data when a caching operation according to a byte caching mode or an object caching mode is performed.

Disclosed is a method including receiving a caching operation request for data from another server; determining a caching mode corresponding to the caching operation request; and transmitting a PCC rule change request to the policy controller according to the caching mode, wherein the PCC rule is a rule that controls charging for the UE based on volume information of the data.

13 Claims, 13 Drawing Sheets

(56) References Cited

U.S. PATENT DOCUMENTS

2013/0054800 A1\* 2/2013 Fernandez Alonso ............... H04L 67/2842
  709/224
2014/0126474 A1\* 5/2014 Eriksson ............. H04W 76/041
  370/328
2014/0153504 A1 6/2014 Wang et al.

\* cited by examiner

METHOD AND APPARATUS FOR CONTROLLING CHARGING BY USING VOLUME INFORMATION OF DATA

CROSS-REFERENCE TO RELATED APPLICATION(S) AND CLAIM OF PRIORITY

The present application is related to and claims priority from and the benefit under 35 U.S.C. §119(a) of Korean Patent Application No. 10-2013-0025732, filed on Mar. 11, 2013, which is hereby incorporated by reference for all purposes as if fully set forth herein.

TECHNICAL FIELD

The present disclosure relates to a method and an apparatus for controlling charging by using volume information of data, and more particularly, to a method and an apparatus for controlling charging for a UE by using volume information of data when a caching operation according to a byte caching mode or an object caching mode is performed.

BACKGROUND

As communication technologies are rapidly developed, a wireless communication system can provide a high-speed data service which can perform a multimedia service, such as an image service, a video service, a Television (TV) service, and the like, as well as a general voice service.

In LTE networks, a server equipment which performs a caching operation according to a byte caching mode or an object caching mode is provided.

In the LTE networks, an Access Cache (AC) equipment connected to an eNB, and a Core Cache (CC) equipment located at an external network of an Evolved Packet Core (EPC) and connected to the EPC through a Packet Data Network GateWay (PDN-Gateway or P-GW) have been introduced.

The byte caching mode and the object caching mode are technologies introduced for reducing a use amount of a back haul and rapidly transmitting data requested from a UE, in the LTE network. In detail, when data which a UE requests exists in the AC in the byte caching mode or the object caching mode, the data is not requested to be transmitted to the CC via the EPC and the AC directly transmits the data to the UE, so as to provide a rapid service.

Further, in today's wireless communication system, a policy for service quality and a charging rule for service use are set, and a fee for a data service provided to the UE is charged according to the set policy and charging rule.

To this end, a Policy and Charging Rules Function (PCRF) receives service information from an Application Function (AF) to generate a Policy and Charging Control rule (PCC rule). Further, the PCRF provides the generated PCC rule to a Policy and Charging Enforcement Function (PCEF). Thereafter, the PCEF provides a Quality of Service (QoS) service according to a service flow to the UE based on the PCC rule.

Since current charging control calculates a fee charged to the UE based on a capacity of a data packet passing through the P-GW, data does not pass through the P-GW when transmitting/receiving data is performed in the byte caching mode or the object caching mode, such that correct charging cannot be performed.

SUMMARY

To address the above-discussed deficiencies, it is a primary object to provide a method and an apparatus for controlling charging for a UE based on not a capacity of a data packet passing through a P-GW but an actual volume of data requested by the UE.

Further, the present disclosure provides a method and an apparatus for controlling charging, in which a server requests a PCC rule and provides volume information of data, such that a PCRF and a PCEF perform policies for controlling charging based on volume information of data.

In accordance with an aspect of the present disclosure, a method of controlling charging for a UE of a server operating outside of a policy enforcer is provided. The method includes receiving a caching operation request for data from another server; determining a caching mode corresponding to the caching operation request; and transmitting a PCC rule change request to a policy controller according to the caching mode, wherein the PCC rule is a rule that controls charging for the UE based on volume information of the data.

In accordance with another aspect of the present disclosure, a method of controlling charging for a UE of a server is provided. The method includes transmitting data requested from the UE to the UE according to a caching mode operation; receiving a data reception response from the UE; and adding volume information of data to the data reception response.

In accordance with another aspect of the present disclosure, a method of controlling charging for a UE of a policy controller is provided. The method includes receiving a PCC rule change request from a server; generating a PCC rule for controlling charging according to volume information of data based on the PCC rule change request; and transmitting information on the generated PCC rule to a policy performer.

In accordance with another aspect of the present disclosure, a method of controlling charging for a UE of a policy performer is provided. The method includes receiving a PCC rule for controlling charging according to volume information of data from a policy controller; receiving the volume information of the data from a server; and calculating a fee for the UE based on the received volume information of the data.

In accordance with another aspect of the present disclosure, a server is provided. The server includes a communication unit that performs data communication with the outside; a storage unit that stores data; and a controller that controls the communication unit to transmit a PCC rule change request to a policy controller according to a caching mode corresponding to a caching operation request when receiving a stored data request and the caching operation request through the communication unit, wherein the PCC rule is a rule for controlling charging for a UE based on volume information of data.

In accordance with another aspect of the present disclosure, a server is provided. The server includes a communication unit that performs data communication with the outside; a storage unit that stores data; and a controller that controls the communication unit to transmit data requested from a UE to the UE according to a caching mode operation, and adds the volume information of the data to a data reception response when receiving the data reception response from the UE through the communication unit.

In accordance with another aspect of the present disclosure, a policy controller is provided. The policy controller includes a communication unit that performs data communication with the outside; a storage unit that stores a PCC rule; and a controller that generates a PCC rule for controlling charging according to volume information of data, stores the PCC rule in the storage unit, and controls the communication unit to transmit information on the PCC rule to a policy performer, based on a PCC rule change request, when receiving the PCC rule change request from a server through the communication unit.

A method and an apparatus for controlling charging according to the present disclosure control charging based on not a capacity of a data packet passing through a P-GW but a capacity of entire data transmitted to a UE, so as to perform current charging even in a byte caching mode or an object caching mode.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method.

Although it is assumed that a method of controlling charging as described below is implemented on an IP Data packet transmission system domain of a communication network, the present disclosure is not necessarily limited thereto.

As terms used in the present specification, a Core Cache (CC) corresponds to core cache equipment, and implies a cache equipment of a new EPC located within a EPC network or a server operating in an external network. An Access Cache (AC) corresponds to access cache equipment, and implies a server directly connected to an eNB to which a UE is connected in a Radio Access Network (RAN).

Further, as terms used in the present specification, a PCRF implies a Policy and Charging Rules Function, and is provided as a representative example of a policy controller. However, the policy controller is not limited to the PCRF, and various policy controllers which generate a PCC rule and a profile related thereto, in addition to the PCRF, may be utilized.

Further, as terms used in the present specification, a PCEF implies a Policy and Charging Enforcement Function, and is provided as a representative example of a policy enforcer. However, the policy enforcer is not limited to the PCEF, and various enforcers which enforce the PCC rule and implement an operation for performing the policy may be utilized.

It should be noted that the technical terms in the specification are merely used for describing a specific embodiment but do not limit the scope of the present disclosure. Further, the technical terms in the specification should be construed as a meaning generally understood by those skilled in the art unless the terms are defined as another meaning and should not be construed as an excessively inclusive meaning or an excessively exclusive meaning.

In addition, a singular expression used in the specification includes a plural expression as long as they are clearly distinguished in the context. Throughout the specification, the terms such as "comprise" or "include" should not be construed as necessarily including all of the various component or operations described in the specification.

Hereinafter, embodiments of the present disclosure will be described in more detail with reference to the accompanying drawings.

Figure 1:
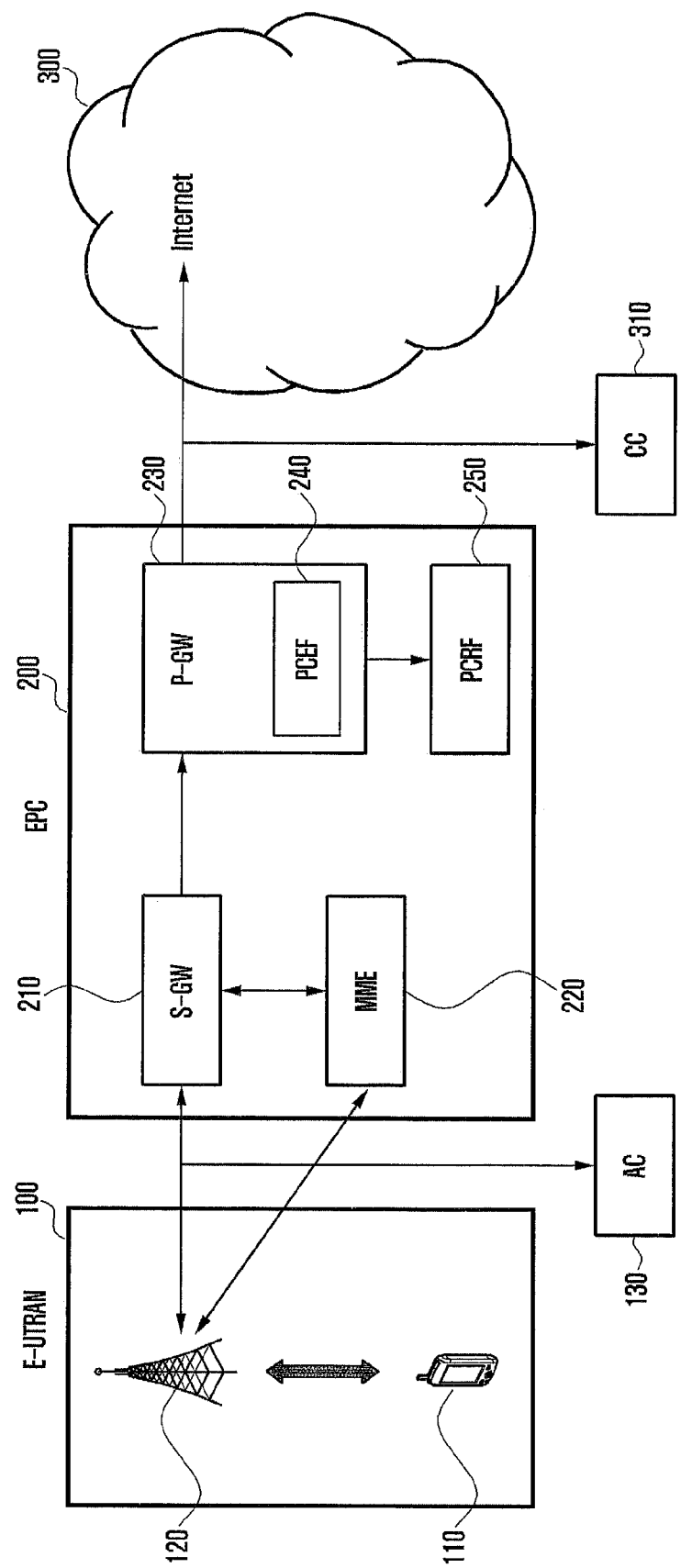
FIG. 1 schematically illustrates a structure of an LTE, network to which the present disclosure is applied.

FIG. 1 schematically illustrates a structure of an LTE network to which the present disclosure is applied. Hereinafter, although an LTE network will be mainly described, the present disclosure is not limited thereto, and may be applied to various mobile communications networks.

Referring to FIG. 1, the LTE network may be configured by an Evolved-UMTS Terrestrial Radio Access Network (E-UTRAN) 100, an Evolved Packet Core (EPC) 200, and an external network 300.

In the E-UTRAN 100, connection between a UE (or a terminal) 110 and an eNB 120 is managed, and an operation for processing authentication and call is performed.

The UE 110 corresponds to a device which can be connected to the LTE network, and includes a smart phone, a portable terminal, a mobile terminal, a Personal Digital Assistant (PDA), a Portable Multimedia Player (PMP) terminal, a note pad, a WiBro terminal, a tablet PC, and the like.

The eNB 120 controls connection between the UE 110 and the EPC 200, and transmits/receives a wireless signal to/from the UE. Further, the eNB 120 may perform a packet exchange according to a TCP/IP protocol such that the UE 110 receives necessary data from a server in a wireless communications network.

The AC 130 stores data for various contents such as an image, a video, a text, and the like. The AC 130 may track a message which the UE 110 transmits/receives to/from the EPC 200 through the eNB 110 in order to receive data. When storing data which the UE 110 uses, the AC 130 may perform a caching operation for providing the corresponding data to the UE 110. The AC 130 may operate in a byte caching mode or an object caching mode according to a detailed method of the caching operation, and a detailed description of each caching mode will be described below with reference to FIGS. 2 and 3.

The EPC 200 may include a Serving Gateway (S-GW) 210, a Mobility Management Entity (MME) 220, a Packet data network Gateway (P-GW) 230, and a PCRF 250.

The S-GW 210 corresponds to an interchange spot between the E-UTRAN 100 and the EPC 200, and may route a reception IP packet and a transmission IP packet to provide the packets to the UE 110. Further, the S-GW 210 controls movement of the UE 110 between the eNBs 120 or between the E-UTRAN 100 and a 3GPP network.

The MME 220 controls and routes a signal related to mobility and security for connection with the E-UTRAN 100 between the eNB 120 and the S-GW 210. The MME 220 may be in charge of tracking and paging of the UE 110 in an idle mode.

The P-GW 230 corresponds to an interchange spot between the EPC 200 and the external network 300 and controls movement of the UE 110 between the LTE and non-3GPP network. The P-GW 230 may include a PCEF 240 and may apply different QoS policies or different PCC rules to each UE 110 through the PCEF 240. The PCEF 240 manages data for an amount of upstream/downstream traffic passing through the P-GW 230 and transferred to the UE 110, a connection time, and the like to ensure that charging for the UE 110 may be applied.

The PCRF 250 determines a policy and a charging rule for each UE 110, i.e. the PCC rule. That is, the PCRF 250 determines QoS information to be used by the UE 110 and which methods or which elements charging for the UE 110 is performed based on.

In detail, the PCRF 250 provides policies applied to a subscriber session to the PCEF 240, a BBERF, and a TDF in forms of PCC/QoS/ADC rules. Here, rules used for packet processing, such as PCC/QoS/ADC rules, refer to a packet processing rule. The PCC/QoS/ADC rules are provided through Gx/Gxx/Sd interfaces. The Gx/Gxx/Sd interfaces transmit a message based on a diameter protocol.

PCC/QoS/ADC rules include the following two elements.

1. Filter information: Filter information corresponds to information for extracting a packet to which the corresponding policy is applied, and may include priority information for prioritizing filters.

2. QoS policy/gating policy/charging policy

The PCC rule and the Qos rule are configured by 5-tuple information, respectively. An ADC rule includes application information. The Qos policy, the gating policy, and the charging policy may collectively refer to policy information. The policy information corresponds to information on a method of processing a packet, and may include at least one of, for example, the QoS policy, the gating policy, and the charging policy.

The PCEF 240 which has received the PCC rule performs a detailed operation for performing the rule, for example, an operation for measuring an amount of upstream/downstream traffic, a connection time, and the like. That is, the PCEF 240 identifies the subscriber session through the received filter information and a 5-tuple of an IP packet passing through the P-GW, and measures a data volume, a use time, and a use amount according to event generation, of the subscriber session, according to the received charging policy.

The external network 300 may imply an internet as a public data network.

The CC 310 stores data for various contents such as an image, a video, a text, and the like. The CC 310 corresponds to a type of content server, and transmits data to the UE 110 by using the TCP when the UE 110 requests the corresponding data. The CC 310 may perform a caching operation according to the request of the AC 130. The CC 310 may operate in a byte caching mode or an object caching mode according to a detailed method of the caching operation, and a detailed description of each caching mode will be described below with reference to FIGS. 2 and 3.

Figure 2:
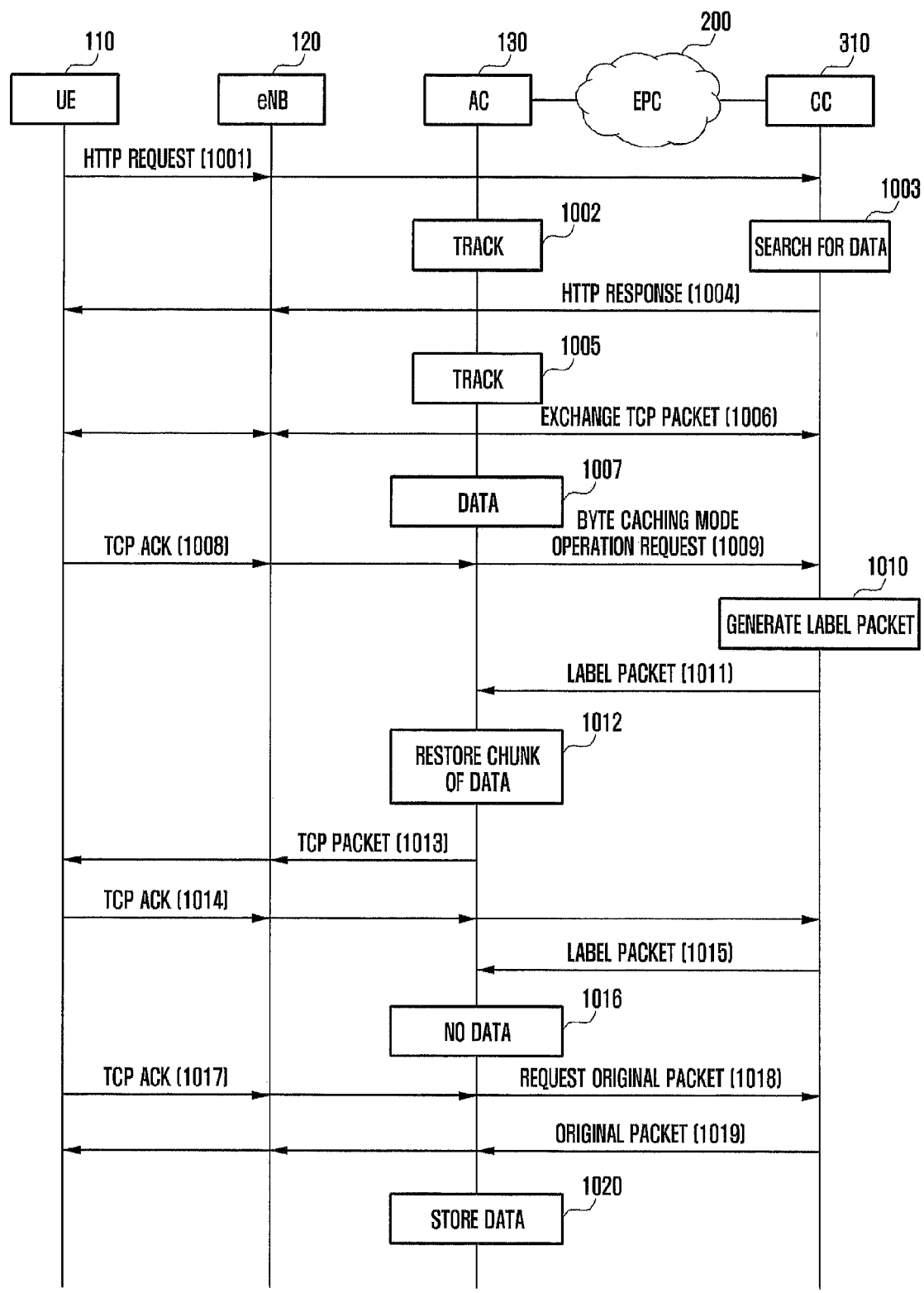
FIG. 2 illustrates a signal flow diagram of an operation sequence of a byte caching mode.

FIG. 2 is a signal flow diagram illustrating an operation sequence of a byte caching mode.

In the LTE network illustrated in FIG. 1, the AC 130 and the CC 310 may perform the caching operation in the byte caching mode. In the byte caching mode, the AC 130 tracks a data request of the UE 110 for the CC 310 to determine whether the requested data is stored. When the data is stored in the AC 130, the AC 130 requests the CC 310 to operate in the byte caching mode and receives a label packet (or finger print) for data from the CC 310, to restore data corresponding to the label. Thereafter, the CC 310 transmits the restored data to the UE 110 through the RAN.

In detail, referring to FIG. 2, the UE 110 first transmits an HTTP request for data to the eNB 120 in order to receive necessary contents, i.e. data (operation 1001). The HTTP request is transmitted to the CC 130 through the eNB 120. The AC 130 tracks the HTTP request transmitted to the CC 310 (in operation 1002).

The CC 310 which has received the HTTP request performs a data search to identify whether data requested by the UE 110 is stored in its own storage unit (operation 1003).

As a result of the data search, when the requested data is stored in the CC 310, the CC 310 transmits an HTTP response to the UE 110 through the eNB 120 (operation 1004). The AC 130 tracks the HTTP response transmitted from the CC 310 to the UE 110 (operation 1005).

Thereafter, the UE 110 performs a packet exchange with the CC 310 through the eNB 120 (operation 1006). The UE 110 transmits/receives a TCP packet to/from the CC 310, and receives data in a unit of packet (or chunk). In this process, the AC 130 continuously tracks the TCP packet which the UE 110 transmits/receives to/from the CC 310.

The AC 130 may determine whether the data requested by the UE 110 is stored in its own storage unit, based on the tracked TCP packet. In detail, the AC 130 may determine whether a chunk of data which the UE 110 wants to receive is stored in its own storage unit.

When the chunk of data which the UE 110 should receive currently is stored (operation 1007), the AC 130 determines to perform the caching operation in the byte caching mode. Accordingly, the AC 130 receives a TCP reception response (TCP Acknowledgement; TCP ACK) from the UE 110 (operation 1008). Further, the AC 130 transmits a byte caching mode operation request to the CC 310 based on a field value determined by a header of the received TCP reception response (operation 1009). Accordingly, the AC 130 and the CC 310 perform an operation according to the byte caching mode.

Next, the CC 310 generates a label packet for a chunk of data to be currently transmitted to the UE 110 (operation 1010). The label packet may include TCP/IP information for the data. The CC 310 transmits the generated label packet to the AC 130.

The AC 130 receives the label packet transmitted by the CC 310 to restore data corresponding to label information in a unit of a chunk (operation 1012). The AC 130 transmits the chunk of restored data to the UE 110 through the eNB 120 by using the TCP packet (operation 1013).

The AC 130 receives a TCP reception response (i.e. TCP ACK) to the transmitted TCP packet from the UE 110 and transmits the TCP reception response to the CC 310 (operation 1014). The AC 130 consistently resets a field of the TCP header in order to perform an operation of the byte caching mode.

Thereafter, the CC 310 transmits a label packet for a chunk of data which the UE 110 should receive next, to the AC 130 (operation 1015).

The AC 130 may determine whether a chunk of data corresponding to label information is stored. When the chunk of data which the UE 110 should receive is not stored (operation 1016), the AC 130 receives a TCP reception response from the UE 110 (operation 1017), and requests the CC 310 to transmit an original packet (operation 1018). That is, the AC 130 no longer sets a value at a header of an ACK packet, and terminates an operation according to the byte caching mode.

The CC 310 which has received the original packet transmission request does not generate a label packet, and transmits the original packet to the UE 110 (operation 1019). The AC 130 may store the data packet which the CC 310 has transmitted, in its own storage unit in a unit of a chunk (operation 1020).

In the byte caching mode, since not the original data but the label packet is transmitted between the AC 130 and CC 310, a use amount of a back haul is small, and data congestion may be avoided.

Figure 3:
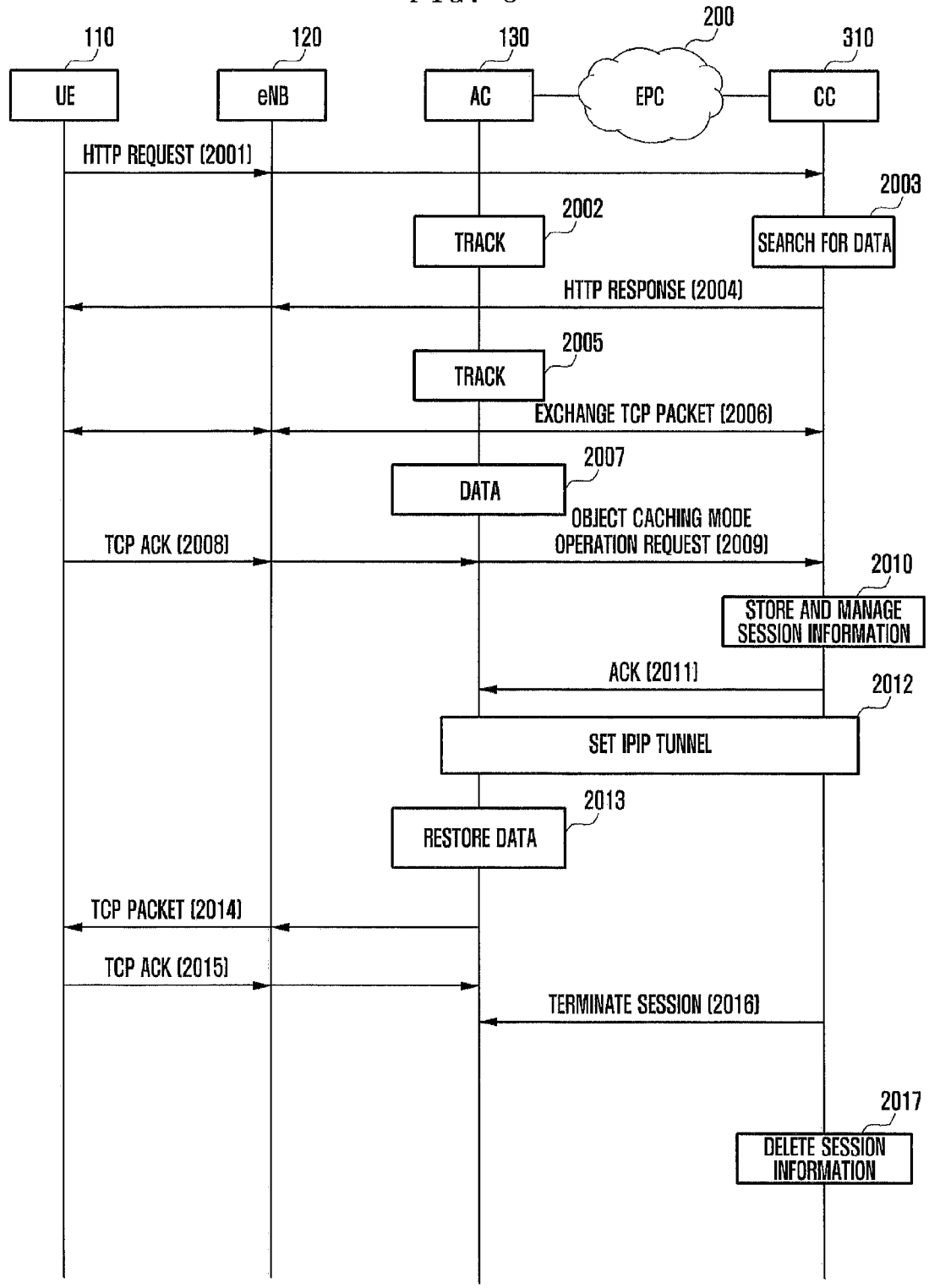
FIG. 3 illustrates a signal flow diagram of an operation sequence of an object caching mode.

FIG. 3 is a signal flow diagram illustrating an operation sequence of an object caching mode.

In the LTE network illustrated in FIG. 1, the AC 130 and the CC 310 may perform the caching operation in the object caching mode. In the object caching mode, the AC 130 tracks a data request of the UE 110 for the CC 310 to determine whether the requested data is stored. When the data is stored in the AC 130, the AC 130 requests the CC 310 to operate in the object caching mode, and directly transmits the corresponding data to the UE 110.

In detail, referring to FIG. 3, the UE 110 first transmits an HTTP request for data to the eNB 120 in order to receive necessary contents, i.e. data (operation 2001). The HTTP request is transmitted to the CC 130 through the eNB 120. The AC 130 tracks the HTTP request transmitted to the CC 310 (operation 2002).

The CC 310 which has received the HTTP request performs a data search to identify whether data requested by the UE 110 is stored in its own storage unit (operation 2003).

As a result of the data search, when the requested data is stored in the CC 310, the CC 310 transmits an HTTP response to the UE 110 through the eNB 120 (operation 2004). The AC 130 tracks the HTTP response transmitted to the CC 310 (operation 2005).

Thereafter, the UE 110 performs a packet exchange with the CC 310 through the eNB 120 (operation 2006). The UE 110 transmits/receives a TCP packet to/from the CC 310, and receives data in a unit of packet (or chunk). In this process, the AC 130 continuously tracks the TCP packet which the UE 110 transmits/receives to/from the CC 310.

The AC 130 may determine whether the data requested by the UE 110 is stored in its own storage unit, based on the tracked TCP packet. In detail, the AC 130 determines whether a chunk of data which the UE wants to receive is stored in its own storage unit, all the corresponding data is stored, and the data is a content corresponding to a CDN service.

When the chunk of data which the UE 110 should receive currently is stored (operation 2007), the AC 130 determines to perform the caching operation in the object caching mode. Accordingly, the AC 130 receives a TCP reception response (TCP Acknowledgement; TCP ACK) from the UE 110 (operation 2008). Further, the AC 130 transmits an object caching mode operation request to the CC 310 based on a field value determined by a header of the received TCP reception response (operation 2009). The AC 130 transmits session information between the UE 110 and the AC 130 together with the request, to the CC 310. This operation may be performed to prepare a case where a handover is generated before session completion. Accordingly, the AC 130 and the CC 310 perform an operation according to the object caching mode. The determination on the object caching mode may be performed at an initial time point when the CC 310 transmits data or while the CC 310 operates in the byte caching mode.

The CC310 stores and manages the received session information (operation 2010). If necessary, the CC 310 may transmit a response for informing that the object caching mode operation request is correctly processed, to the AC 130 (operation 2011).

If necessary, the AC 130 establishes an IPIP tunnel with the CC 310 (operation 2012). The IPIP tunnel is used when the UE 110 performs a handover hereafter, and may be dynamically generated or previously set.

Next, the AC 130 restores the stored data (operation 2013). Further, the AC 130 transmits the restored data to the UE 110 through the TCP packet (operation 2014). In this embodiment, the AC 130 may intercept a session between the CC 310 and the UE 110 to transmit the TCP packet through the corresponding session.

The UE 110 which has received the TCP packet transmits a TCP reception response to the AC 130 (operation 2015). The AC 130 which has received the TCP reception response notifies the CC 310 of a session termination according to data transmission completion (operation 2016). The CC 310 which has been notified of the session termination deletes the stored session information (operation 2017).

In the object caching mode, since the AC 130 is a final end of the TCP connection, an original data or a label packet is not transmitted between the AC 130 and the CC 310, such that a back haul is hardly used.

In the above-described byte caching mode or object caching mode, the AC 130 transmits data to the UE 110, such that data substantially passing through P-GW 230 does not exist or is reduced. Thus, when the PCEF 240 controls charging based on a data capacity passing through the P-GW 230 according to the related art, it may be impossible to formulate an exact charge.

Thus, the present disclosure provides a method of controlling charging based on volume information of data in the byte caching mode or in the object caching mode.

Hereinafter, although an access cache, a core cache, a PCRF, and a PCEF will be mainly described as components for implementing the present disclosure, more components may be used, and various policy controllers in addition to the PCRF, various policy enforcers in addition to the PCEF, and packet processing devices (e.g. a BBERF and a TDF) may be used. Further, the packet processing device represented as the PCEF corresponds to a component included in the P-GW, and the PCEF and the P-GW are equal to each other according to the implementation example.

Figure 4:
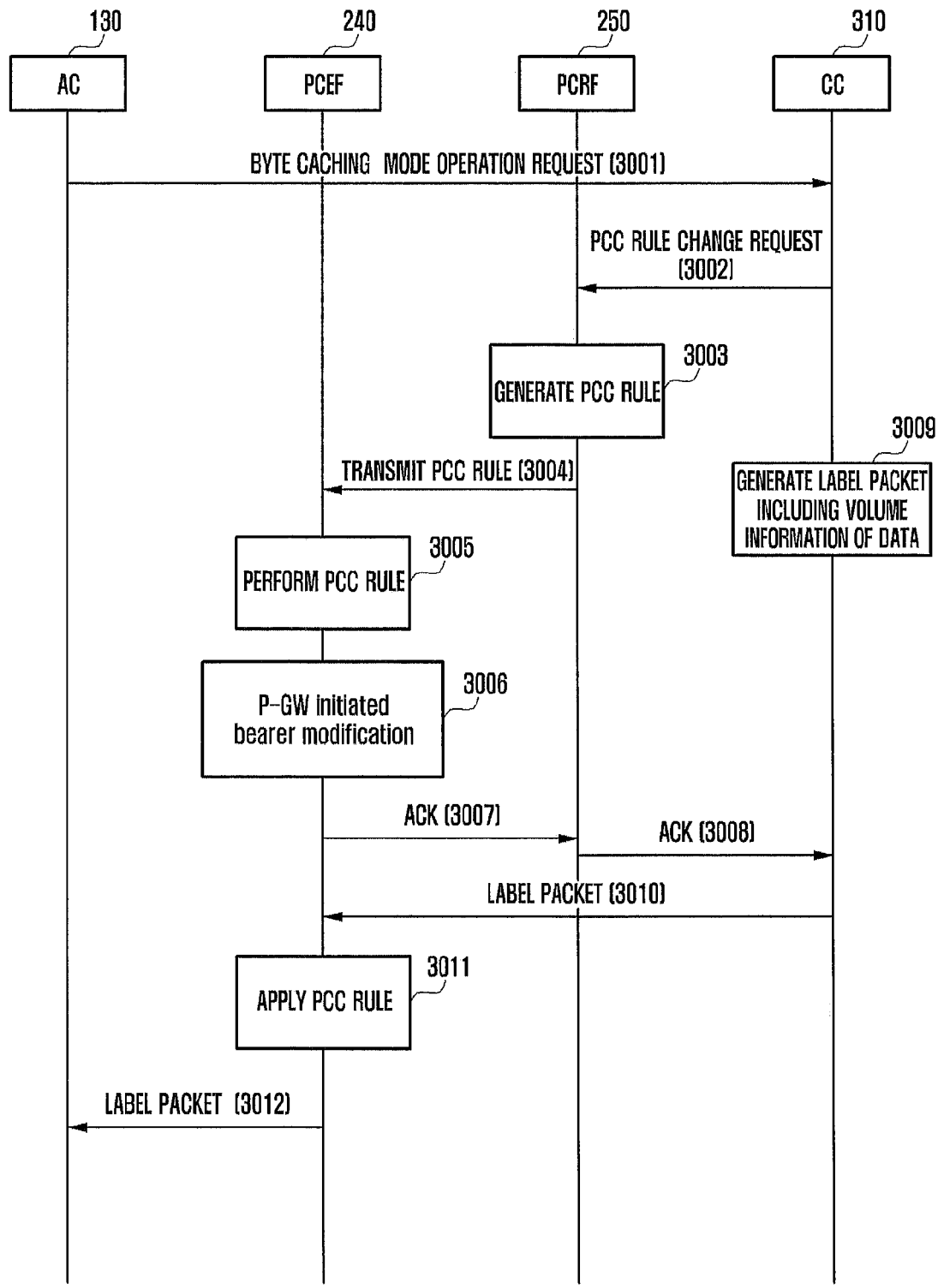
FIG. 4 illustrates a signal flow diagram of a method of controlling charging in a byte caching mode according to an embodiment of the present disclosure.

FIG. 4 is a signal flow diagram illustrating a method of controlling charging in a byte caching mode according to an embodiment of the present disclosure.

Referring to FIG. 4, first, after determining to operate in the byte caching mode, the AC 130 transmits a byte caching mode operation request to the CC 310 (operation 3001).

The CC 310 which has received the byte caching mode operation request starts a re-negotiation process. That is, the CC 310 transmits a PCC rule change request for informing that the PCC rule is needed to be changed, to the PCRF 250 (operation 3002). The PCC rule change request may be transmitted by using a diameter of an Authentication-Authorization Request (AAR) message.

The PCRF 250 which has received the PCC rule change request generates a PCC rule according to the caching mode (operation 3003). The PCRF 250 generates a PCC rule corresponding to the byte caching mode. The PC rule includes a charging policy for determining a fee for the UE 110 by using volume information of data which the UE 110 requests. In detail, the PCC rule may include the following points.

1. Traffic Filtering Information: corresponds to information for filtering a label packet, and may be IP 5-tuple information.

2. Measurement method: measures a use amount of the UE 110 based on volume information of data included in the label packet.

The PCRF 250 transmits the generated PCC rule to the PCEF 240 (operation 3004). The PCC rule may be transmitted by using a diameter of a Re-Authentication Request (RAR) message.

The PCEF 240 performs the transmitted PCC rule (operation 3005). If necessary, the PCEF 240 may exchange a message with a charging system such as an Online Charging System (OCS) or an Offline Charging System (OFCS). The PCEF 240 may acquire a charging credit through the message exchange. Further, if necessary, the PCEF 240 may perform P-GW initiated bearer modification defined in chapter 5.4.2 of 3GPP TS 23.401 (operation 3006).

Next, the PCEF 240 transmits a response (i.e. ACK) to the PCC rule to the PCRF 250 (operation 3007). The PCRF 250, which has received the response, transmits a response to the PCC rule change request to the CC 310 (operation 3008).

Figure 5:
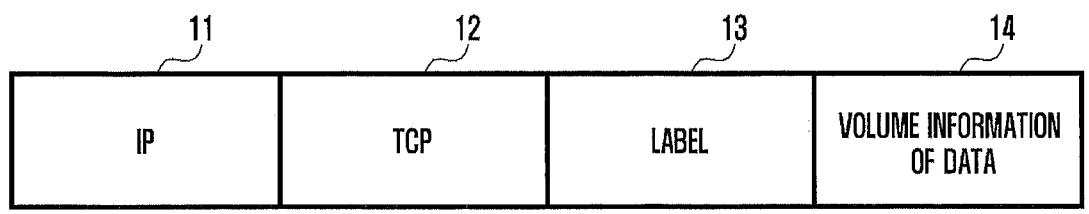
FIG. 5 illustrates a structure of a label packet according to the present disclosure.

After transmitting the PCC rule change request, the CC 310 generates a label packet (operation 3009). FIG. 5 illustrates a structure of a label packet according to the present disclosure. Referring to FIG. 5, the label packet may include an IP header 11, a TCP header 12, and a label 13 for data. In an embodiment, the label packet includes volume information 14 of data. The label may be written in an option field of the IP header 11, an option field of the TCP header 12, or may be written in a GTP header when the CC 310 is added to EPC entity.

The label 13 includes an identifier for identifying and designating original data of the AC 130. The identifier may be allocated in the following forms.

1. Hash value: is a value obtained by applying Hash function to the original data.

2. Contents name: is an identifier which can identify contents (data) itself, like URL of HTTP.

The volume information 14 of the data may be allocated as a value obtained by summing a volume of the original data designated by the label 13 and volumes of an IP header and a TCP header which are generated when the data is restored. The volume of the data allocated to the volume information 14 of the data may be determined by Equation (1).

$$\text{Size} = \left[ \frac{\text{content}_{size}}{\text{packet}_{size}} \right] \times (IP_{header\ size} + TCP_{header\ size})$$

The CC 310 transmits the label packet generated by including the volume information 14 of the data to the PCEF 240 (operation 3010).

The PCEF 240 which has received the label packet applies the PCC rule transmitted from the PCRF 250 (operation 3011). The PCEF 240 may apply the PCC rule by controlling charging of the UE 110 by using the volume information of the data. Application of the PCC rule of the PCEF may include the following contents.

1. Filtering session of the label packet through an IP 5-tuple.

2. Applying measurement of a use amount of the UE 110 based on the volume information of the data of the filtered label packet.

Thereafter, the label packet transmitted by the CC 310 is transmitted to the AC 130 through the P-GW 230 including the PCEF 240 (operation 3012). The AC 130 may transmit data requested to the UE 110 by using the label packet according to the byte caching mode.

Figure 6:
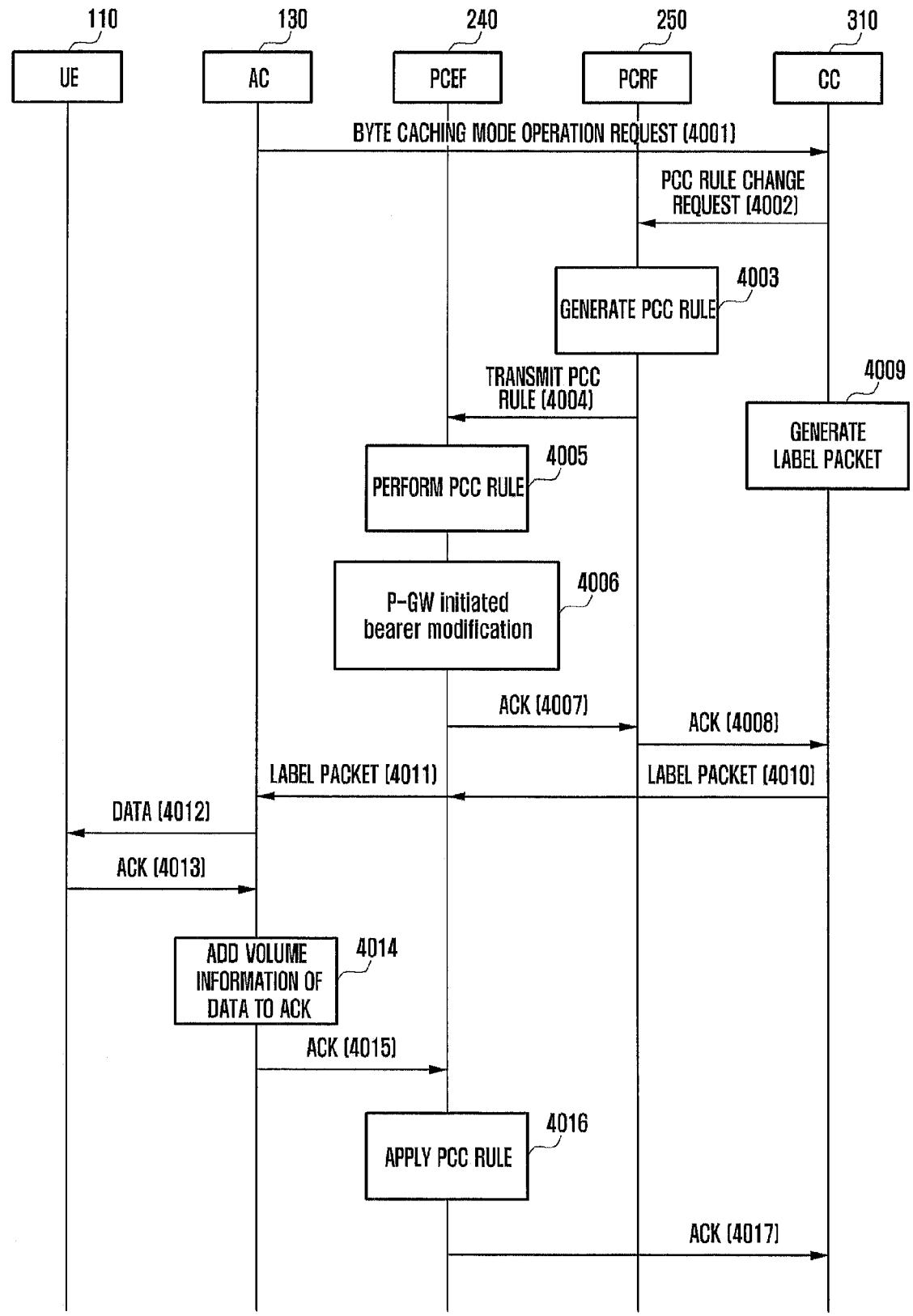
FIG. 6 illustrates a signal flow diagram of a method of controlling charging in a byte caching mode according to another embodiment of the present disclosure.

FIG. 6 is a signal flow diagram illustrating a method of controlling charging in a byte caching mode according to another embodiment of the present disclosure.

Referring to FIG. 6, first, after determining to operate in the byte caching mode, the AC 130 transmits a byte caching mode operation request to the CC 310 (operation 4001).

The CC 310 which has received the byte caching mode operation request starts a re-negotiation process. That is, the CC 310 transmits a PCC rule change request for informing that the PCC rule is needed to be changed, to the PCRF 250 (operation 4002). The PCC rule change request may be transmitted by using a diameter of an Authentication-Authorization Request (AAR) message.

The PCRF 250 which has received the PCC rule change request generates a PCC rule according to the caching mode (operation 4003). The PCRF 250 generates a PCC rule corresponding to the byte caching mode. The PC rule includes a charging policy for determining a fee for the UE 110 by using volume information of data which the UE 110 requests. In detail, the PCC rule may include the following points.

1. Traffic Filtering Information: corresponds to information for filtering a label packet, and may be IP 5-tuple information.

2. Measurement method: measures a use amount of the UE 110 based on volume information of data included in a data reception response (data Acknowledgement; data ACK) packet.

The PCRF 250 transmits the generated PCC rule to the PCEF 240 (operation 4004). The PCC rule may be transmitted by using a diameter of a Re-Authentication Request (RAR) message.

The PCEF 240 performs the transmitted PCC rule (operation 4005). If necessary, the PCEF 240 may exchange a message with a charging system such as an Online Charging System (OCS) or an Offline Charging System (OFCS). The PCEF 240 may acquire a charging credit through the message exchange. Further, if necessary, the PCEF 240 may perform P-GW initiated bearer modification defined in chapter 5.4.2 of 3GPP TS 23.401 (operation 4006).

Next, the PCEF 240 transmits a response to the PCC rule to the PCRF 250 (operation 4007). The PCRF 250, which has received the response, transmits a response to the PCC rule change request to the CC 310 (operation 4008).

After transmitting the PCC rule change request, the CC 310 generates a label packet (operation 4009). The label packet may include an IP header 11, a TCP header 12, and a label 13 for data. Detailed contents about the label packet are equal to the contents described with reference to FIG. 5. However, in the embodiment of the present disclosure, the label packet does not include the volume information 14 of the data, unlike the contents illustrated in FIG. 5.

The CC 310 transmits the label packet generated by including the volume information 14 of the data to the PCEF 240 (operation 4010). The PCEF 240, which has received the label packet, transmits the label packet to the AC 130 (operation 4010).

The AC 130, which has received the label packet, restores original data according to the byte caching mode operation and transmits the original data to the UE 110 (operation 4012). The UE 110, which has received the data, transmits a data reception response (data ACK) to the AC 130 (operation 4013).

Figure 7:
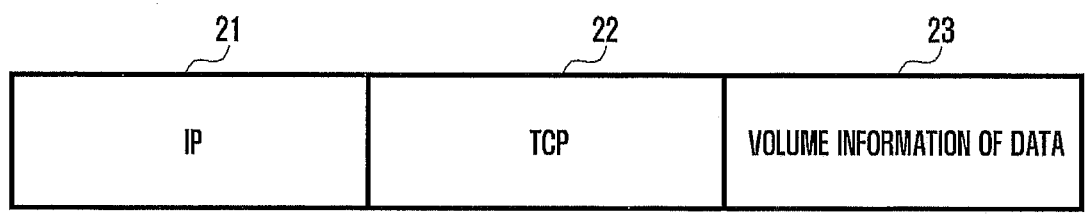
FIG. 7 illustrates a structure of a data reception response according to the present disclosure.

The AC 130, which has received the data reception response, adds volume information of data actually transmitted to the UE 110 to the data reception response (operation 4014). The AC 130 may add volume information of original data authenticated through the data reception response to the data reception response. FIG. 7 illustrates a structure of a data reception response according to the present disclosure. As illustrated in FIG. 7, the data reception response includes volume information 23 of data added by the AC 130. The volume information of the data may indicate a packet volume of data which is authenticated by the data reception response and is actually transmitted.

The AC 130 transmits the data reception response, to which the volume information 23 of the data is added, to the PCEF 240 (operation 4015).

The PCEF 240 which has received the data reception response applies the PCC rule transmitted from the PCRF 250 (operation 4016). The PCEF 240 may apply the PCC rule by controlling charging of the UE 110 by using the volume information of the data.

Thereafter, the PCEF 240 transmits the data reception response to CC 310 (operation 4017). The PCEF 240 may delete the volume information of the data, used to apply the PCC rule, in order to reduce a capacity of traffic and may transmit the data reception response, in which the volume information of the data is deleted, to the CC 310.

Figure 8:
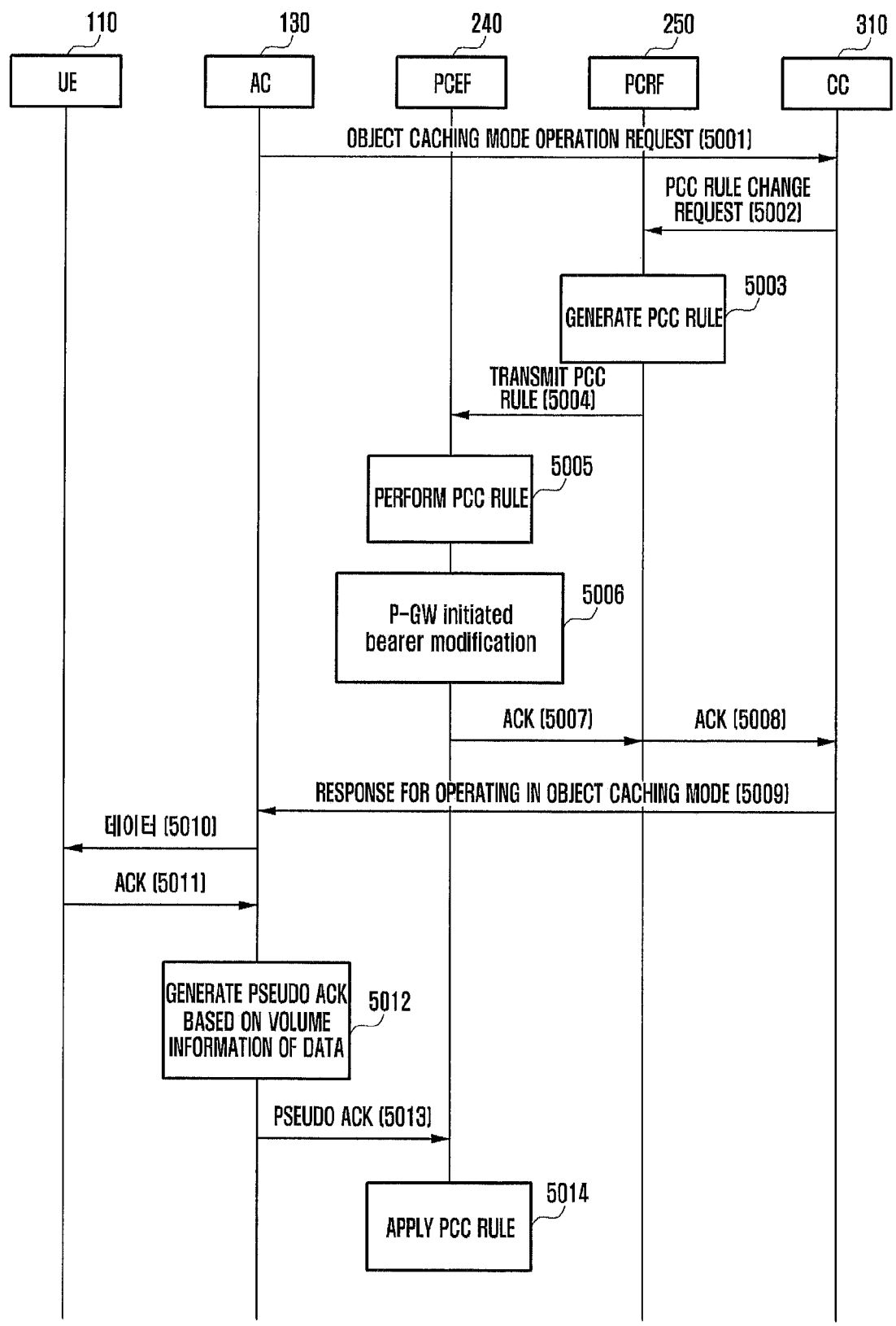
FIG. 8 illustrates a signal flow diagram of a method of controlling charging in an object caching mode according to an embodiment of the present disclosure.

FIG. 8 is a signal flow diagram illustrating a method of controlling charging in an object caching mode according to an embodiment of the present disclosure.

Referring to FIG. 8, first, after determining to operate in the object caching mode, the AC 130 transmits an object caching mode operation request to the CC 310 (operation 5001).

The CC 310 which has received the object caching mode operation request starts a re-negotiation process. That is, the CC 310 transmits a PCC rule change request for informing that the PCC rule is needed to be changed, to the PCRF 250 (operation 5002). The PCC rule change request may be transmitted by using a diameter of an Authentication-Authorization Request (AAR) message.

The PCRF 250 which has received the PCC rule change request generates a PCC rule according to the caching mode (operation 5003). The PCRF 250 generates a PCC rule corresponding to the object caching mode. The PCC rule includes a charging policy for determining a fee for the UE 110 by using volume information of data which the UE 110 requests. In detail, the PCC rule may include the following points.

1. Traffic Filtering Information: corresponds to information for filtering a label packet, and may be IP 5-tuple information.

2. Measurement method: measures a use amount of the UE 110 based on volume information of data included in a data reception response (data Acknowledgement; data ACK) packet.

The PCRF 250 transmits the generated PCC rule to the PCEF 240 (operation 5004). The PCC rule may be transmitted by using a diameter of a Re-Authentication Request (RAR) message.

The PCEF 240 performs the transmitted PCC rule (operation 5005). If necessary, the PCEF 240 may exchange a message with a charging system such as an Online Charging System (OCS) or an Offline Charging System (OFCS). The PCEF 240 may acquire a charging credit through the message exchange. Further, if necessary, the PCEF 240 may perform P-GW initiated bearer modification defined in chapter 5.4.2 of 3GPP TS 23.401 (operation 5006).

Next, the PCEF 240 transmits a response to the PCC rule to the PCRF 250 (operation 5007). The PCRF 250, which has received the response, transmits a response to the PCC rule change request to the CC 310 (operation 5008).

Thereafter, the CC 310 transmits an object caching mode operation response to the object caching mode operation request, to the AC 130 (operation 5009). Accordingly, the AC 130 and the CC 310 perform an operation according to the object caching mode.

The AC 130, which has received the object caching mode operation response, restores original data according to the object caching mode and transmits the original data to the UE 110 (operation 5010). The UE 110, which has received the data, transmits a data reception response (data ACK) to the AC 130 (operation 5011).

The AC 130, which has received the data reception response, generates a pseudo ACK including volume information of data actually transmitted to the UE 110 (operation 5012). The pseudo ACK may be generated by adding the volume information of the data to the data reception response, in which case the pseudo ACK may have a packet structure as illustrated in FIG. 7. The AC 130 may add volume information of original data authenticated through the data reception response to the data reception response. The pseudo ACK may be used to inform the PCEF 240 of a use amount of data. That is, the pseudo ACK corresponds to a message generated even when a TCP ACK is not waited for since the CC 310 does not substantially transmit the data packet, and is generated in order to inform the PCEF 240 of the use amount of data.

The AC 130 transmits the pseudo ACK, to which the volume information 23 of the data is added, to the PCEF 240 (operation 5013).

The PCEF 240 which has received the data reception response applies the PCC rule transmitted from the PCRF 250 (operation 5014). The PCEF 240 may apply the PCC rule by controlling charging of the UE 110 by using the volume information of the data.

The PCEF 240 may transmit the pseudo ACK to the CC 310 according to a filtering rule for informing a status of data transmission to the CC 310. Otherwise, since the CC 310, which does not actually transmit the data packet, does not need a data reception response, the PCEF 240 may drop the received pseudo ACK.

Figure 9:
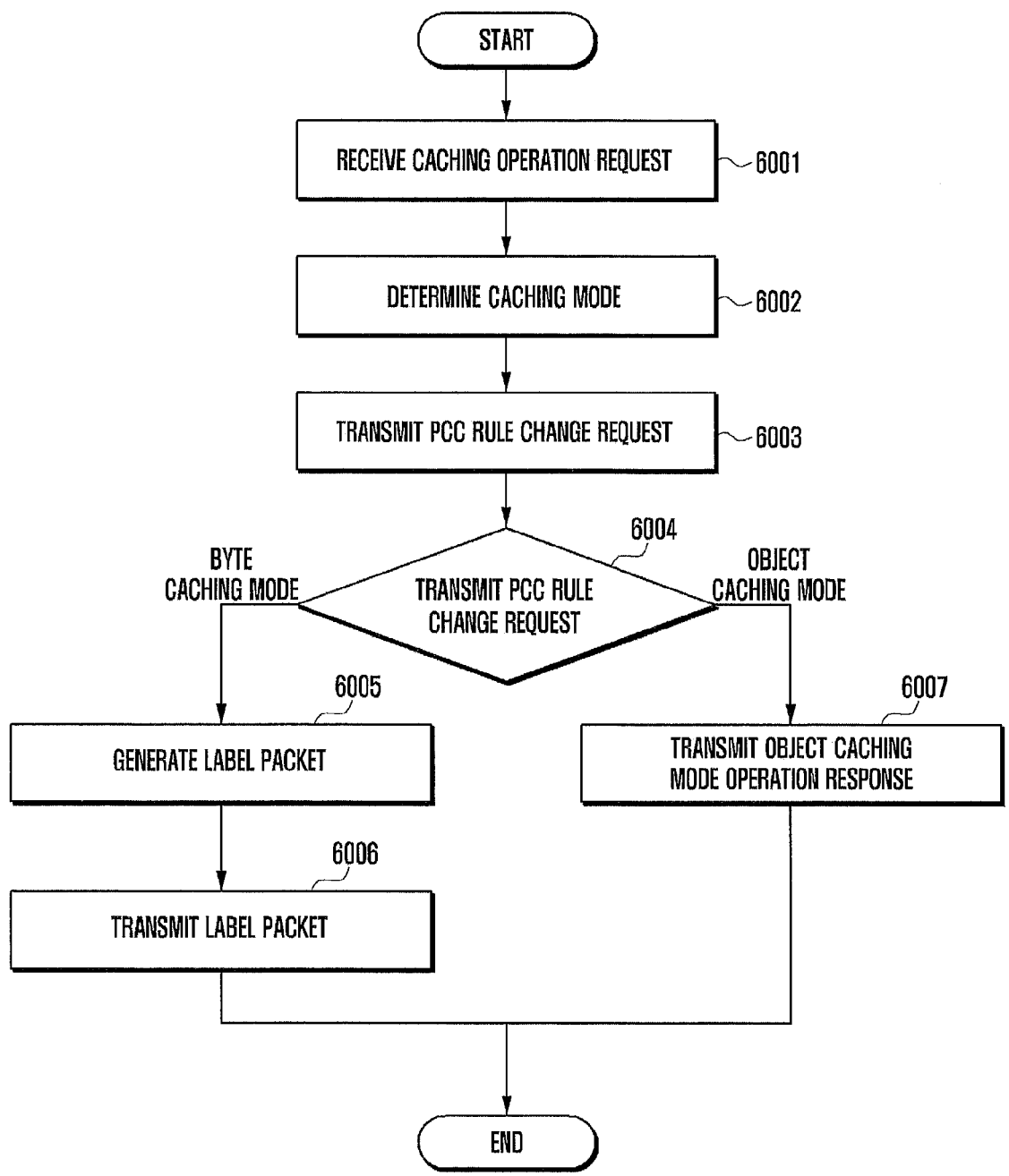
FIG. 9 illustrates a process of a method of controlling charging of a core cache according to the present disclosure.

FIG. 9 is a flowchart illustrating a method of controlling charging of a core cache according to the present disclosure.

Referring to FIG. 9, the CC 310 receives a caching operation request for data which the UE 110 requests, from the AC 130 (operation 6001). The CC 310 may determine the caching mode based on the caching operation request (operation 6002). The CC 310 may determine whether the byte caching mode is requested or the object caching mode is requested, according to the caching operation request of the AC 130.

The CC 310 transmits a PCC rule change request to a policy controller to change the PCC rule in response to the caching mode (operation 6003).

Next operations may be changed according to whether the CC 310 operates in the byte caching mode or the object caching mode (operation 6004).

When the CC 310 operates in the byte caching mode, the CC 310 generates a label packet for data (operation 6005). The label packet may include volume information of data.

The CC 310 transmits the generated label packet to the PCEF (operation 6006). When the label packet includes the volume information of the data, the PCEF 240 may control charging for the UE 110 by using the volume information of the data. When the label packet does not include the volume information of the data, the CC 310 may receive a data reception response including the volume information of the data, from the PCEF 240.

When the CC 310 operates in the object caching mode, the CC 310 transmits the object caching mode operation response to the AC 130 (operation 6007). Accordingly, the CC 310 ensures that the AC 130 directly transmits data to the UE 110.

Figure 10:
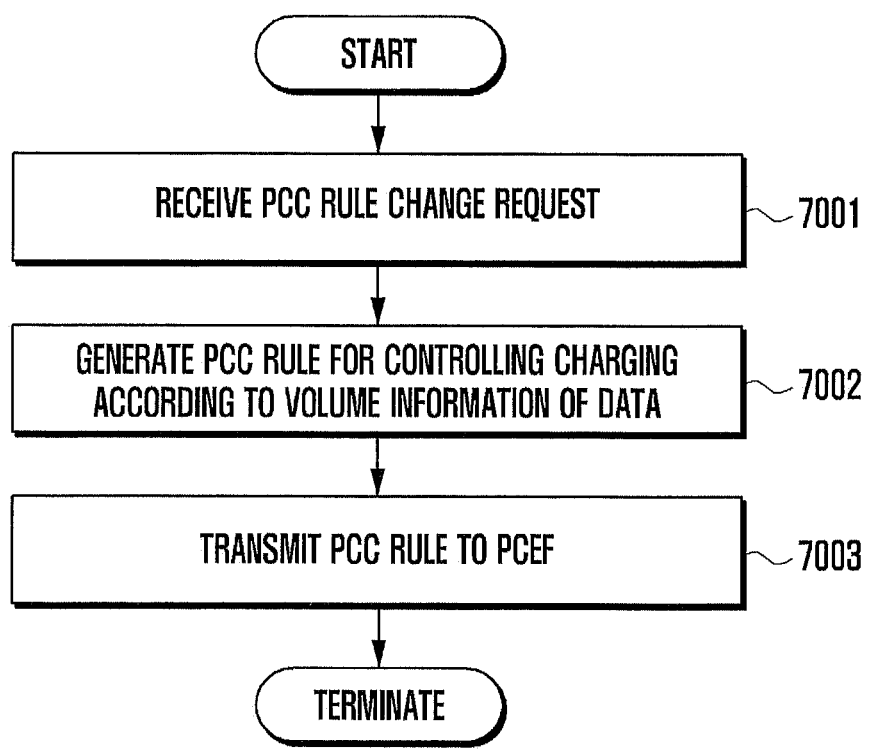
FIG. 10 illustrates a process of a method of controlling charging of a policy controller according to the present disclosure.

FIG. 10 is a flowchart illustrating a method of controlling charging of a policy controller according to the present disclosure. Hereinafter, an operation of the PCRF 250 as a policy controller will be mainly described.

Referring to FIG. 10, the PCRF 250 receives a PCC rule change request from the CC 310 (operation 7001). Accordingly, the PCRF 250 generates a PCC rule for controlling charging for the UE 110 according to volume information of data (operation 7002). The PCC rule may acquire the volume information of the data through a label packet which the CC 310 transmits, or may include contents acquired through a data reception response received from the AC 130.

The PCRF 250 transmits the generated PCC rule to the PCEF 240 such that the PCEF 240 applies the PCC rule and performs an operation according to the PCC rule (operation 7003).

Figure 11:
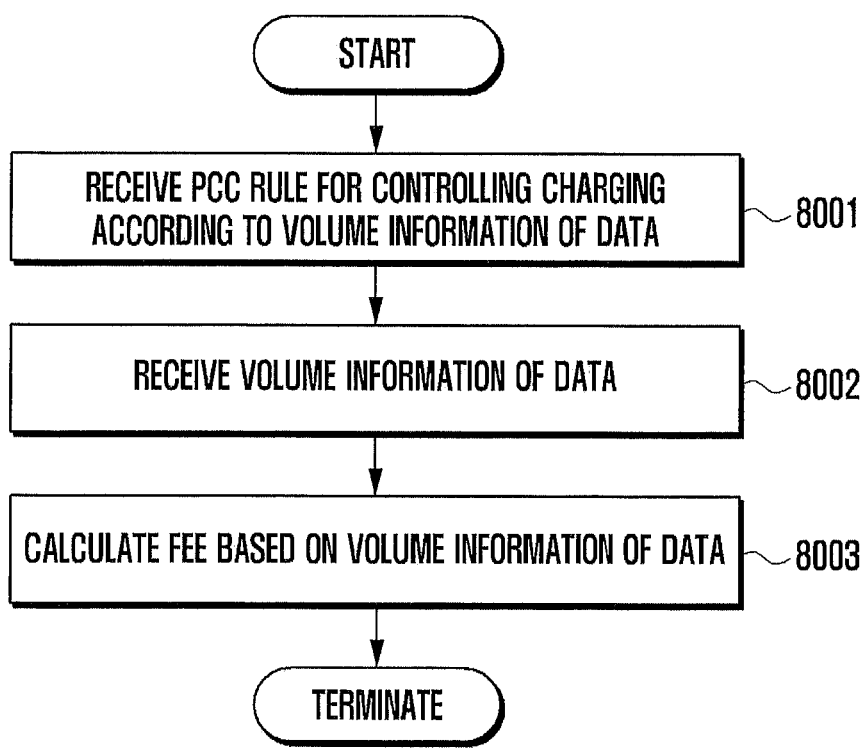
FIG. 11 illustrates a process of a method of controlling charging of a policy enforcer according to the present disclosure.

FIG. 11 is a flowchart illustrating a method of controlling charging of a policy enforcer according to the present disclosure. Hereinafter, an operation of the PCEF 240 as a policy enforcer will be mainly described.

Referring to FIG. 11, the PCEF 240 receives a PCC rule for controlling charging according to volume information of data which the UE 110 requests, from the PCRF 250 (operation 8001).

Thereafter, the PCEF 240 receives the volume information of the data (operation 8002). The volume information of the data may be received through a label packet which the CC 310 transmits or a data reception response which the AC 130 transmits, according to the PCC rule.

The PCEF 240 calculates charging of the UE 110 based on the acquired volume information of data (operation 8003). The PCEF 240 measures a use amount of service of the UE 110 according to the volume information of the data and calculates a fee according to the use amount, so as to control charging for the UE 110.

Figure 12:
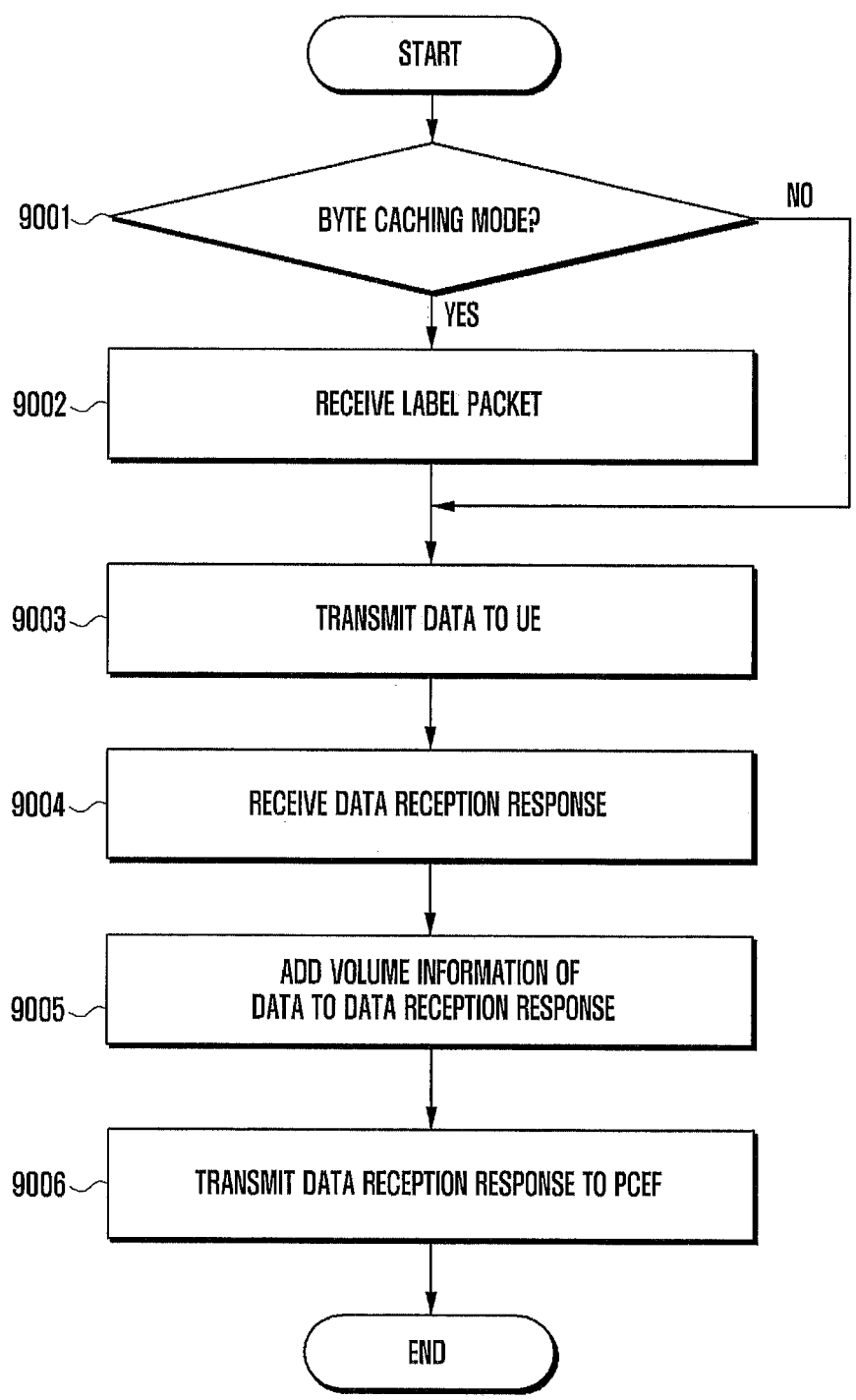
FIG. 12 illustrates a process of a method of controlling charging of an access cache according to the present disclosure.

FIG. 12 is a flowchart illustrating a method of controlling charging of an access cache according to the present disclosure.

Referring to FIG. 12, the AC 130 determines whether to operate in the byte caching mode (operation 9001).

When operating in the byte caching mode, the AC 130 may transmit a byte caching mode operation request to the CC 310. Thereafter, the AC 130 receives a label packet from the CC 310 (operation 9002). The label packet may include volume information of data for applying a PCC rule. In an embodiment, when not operating in the byte caching mode, the AC 130 may not receive the label packet. When operating in the object caching mode, the AC 130 may receive an object caching mode operation response from the CC 310.

Next, the AC 130 transmits data to the UE 110 (operation 9003). The AC 130 restores stored data to transmit the data to the UE 110. The data transmission may be performed based on the received label packet.

After completing the data transmission, the AC 130 receives a data reception response from the UE 110 (operation 9004).

Next, the AC 130 adds volume information of data to the data reception response (operation 9005). Further, the AC 130 transmits the data reception response to the PCEF 240 (operation 9006). When already receiving the volume information of the data through the label packet, the AC 130 may not add the volume information of the data to the data reception response.

Figure 13:
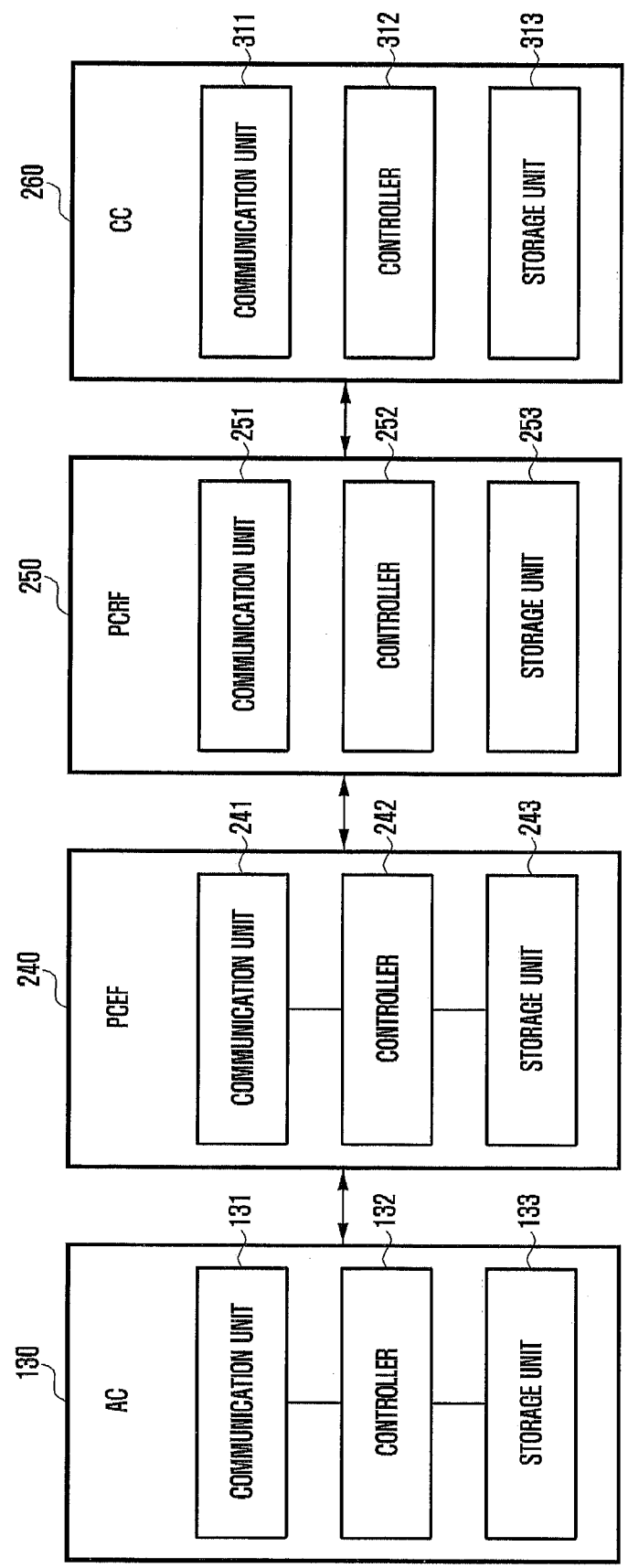
FIG. 13 illustrates block diagrams of structures an AC, a PCEF, a PCRF, and a CC according to the present disclosure.

FIG. 13 is block diagrams illustrating structures an AC, a PCEF, a PCRF, and a CC according to the present disclosure.

Referring to FIG. 13, the CC 310 may include a communication unit 311 for performing data communication with the outside, a storage unit 313 for storing at least a piece of data, and a controller 312. When receiving a stored data request and a caching operation request through the communication unit 311, the controller 312 controls the communication unit 311 to transmit a PCC rule change request to a policy controller according to a caching mode corresponding to the caching operation request. The PCC rule is a rule for controlling charging for the UE 110 based on the volume information of the data.

The controller 312 generates a label packet for data, and controls the communication unit 311 to transmit the label packet to the PCEF 240. The controller 312 may generate a label packet including volume information of data.

The communication unit 311 may receive a data reception response including the volume information of the data from AC 130.

The AC 130 may include a communication unit 131 for performing data communication with the outside, a storage unit 133 for storing data, and a controller 132. The controller 132 controls the communication unit 131 to transmit data requested from the UE 110 to the UE 110 according to a caching mode operation. Further, when receiving a data reception response from the UE 110, the controller 132 may add volume information of data to the data reception response. In an embodiment, the controller 132 may control the communication unit 131 to transmit the data reception response, to which the volume information of the data is added, to the PCEF 240.

The communication unit 131 may receive the label packet including the volume information of the data form the CC 310.

The PCRF 250 may include a communication unit 251 for performing data communication with the outside, a storage unit 253 for storing a PCC rule, and a controller 252. When receiving a PCC rule change request from the CC 310 through the communication unit 251, the controller 252 generates and stores the PCC rule for controlling charging by using volume information of data, and controls the communication unit 251 to transmit the PCC rule to the PCEF 240.

The PCEF 240 may include a communication unit 241 for performing data communication with the outside, a storage unit 243 for storing data needed for performing a PCC rule, and a controller 242. When receiving a PCC rule from the PCRF 250 through the communication unit 241, the controller 242 may measure a use amount of the UE 110 based on volume information of data according to the PCC rule and may calculate a fee.

Although the present disclosure has been described with an example embodiment, various changes and modifications may be suggested to one skilled in the art. It is intended that the present disclosure encompass such changes and modifications as fall within the scope of the appended claims.

What is claimed is:

1. A method of controlling charging for data requested by a terminal at a core server storing the data and operating between a policy enforcer and an external network, the method comprising:
    receiving a caching operation request for the data from an access server storing the data;
    transmitting a policy and charging control (PCC) rule change request to a policy controller;
    generating a label packet including identifying information and volume information of the data; and
    transmitting, to the access server, the label packet via the policy enforcer, wherein the data is charged by the policy enforcer based on the volume information included in the label packet, and wherein the data is transmitted to the terminal by the access server based on the transmitted label packet.

2. The method of claim 1, wherein the charging for the data is performed by the policy enforcer using a PCC rule, and wherein the PCC rule is changed by the policy controller in response to the PCC rule change request transmitted from the core server.

3. The method of claim 1, wherein the data is transmitted from the access server to the terminal if the access server receives the label packet.

4. A method of controlling charging for data requested by a terminal at an access server storing the data, the method comprising:
    transmitting a caching operation request for the data to a core server operating between a policy enforcer and an external network;
    receiving, via the policy enforcer, a label packet generated by the core server, wherein the label packet includes identifying information and volume information of the data; and
    transmitting the data to the terminal based on the received label packet, wherein the data is charged by the policy enforcer based on the volume information included in the label packet.

5. The method of claim 4, wherein the charging for the data is performed by the policy enforcer using a policy and charging control (PCC) rule based on the volume information of the data included in the label packet, and wherein the PCC rule is changed by a policy controller in response to a PCC rule change request transmitted from the core server.

6. A method of controlling charging for data requested by a terminal at a policy controller, the method comprising:
    receiving a policy and charging control (PCC) rule change request from a core server storing the data;
    generating a PCC rule, in response to the PCC rule change request, for controlling charging for the data; and
    transmitting information on the generated PCC rule to a policy enforcer,
    wherein a caching operation request for the data is transmitted from an access server storing the data to the core server before the PCC rule change request is transmitted from the core server to the policy controller, and wherein the data is charged by the policy enforcer based on volume information included in a label packet which is generated by the core server, and wherein the core server transmits a label packet including identifying information and volume information of the data to the access server via the policy enforcer, and wherein the access server transmit the data to the terminal based on the transmitted label packet.

7. A method of controlling charging for a terminal of data requested by terminal, at a policy enforcer, the method comprising:
    receiving a policy and charging control (PCC) rule, from a policy controller, for controlling charging for the data;
    receiving a label packet including identifying information and volume information of the data from a core server storing the data;
    transmitting the label packet to an access server; and
    charging the data based on the received volume information of the data included in the label packet using the PCC rule,
    wherein a caching operation request for the data is transmitted from the access server storing the data to the core server before the PCC rule is transmitted from the policy controller to the policy enforcer, wherein the data is transmitted to the terminal by the access server based on the transmitted label packet.

8. A core server operating between a policy enforcer and an external network comprising:
    a communication interface configured to transmit and receive signals a storage configured to store data; and
    a controller operably connected to the storage and the communication interface, the controller configured to:
        control the communication interface to receive a caching operation request for the data from an access server storing the data;

control the communication interface to transmit a policy and charging control (PCC) rule change request to a policy controller;

generate a label packet including identifying information and volume information of the data; and control the communication interface to transmit, to the access server, the label packet via the policy enforcer, wherein the data is charged by the policy enforcer based on the volume information included in the label packet, and wherein the data is transmitted to a terminal by the access server based on the transmitted label packet.

9. The core server of claim 8, wherein the charging for the data is performed by the policy enforcer using a PCC rule, and wherein the PCC rule is changed by the policy controller in response to the PCC rule change request transmitted from the core server.

10. The core server of claim 8, wherein the data is transmitted from the access server to a terminal if the access server receives the label packet.

11. An access server comprising:
a communication interface configured to perform communication with outside;
a storage configured to store data; and
a controller operably connected to the storage and the communication interface, the controller configured to:
control the communication interface to transmit a caching operation request for the data to a core server storing the data and operating between a policy enforcer and an external network;
control the communication interface to receive, via the policy enforcer, a label packet generated by the core server, wherein the label packet includes identifying information and volume information of the data; and
control the communication interface to transmit the data to a terminal based on the received label packet, wherein the data is charged by the policy enforcer based on the volume information included in the label packet.

12. The access server of claim 11, wherein the charging for the data is performed by the policy enforcer using a policy and charging control (PCC) rule based on the volume information of the data included in the label packet, and wherein the PCC rule is changed by a policy controller in response to a PCC rule change request transmitted from the core server.

13. A policy controller comprising:
a communication interface configured to transmit and receive signals;
a storage configured to store a policy and charging control (PCC) rule; and
a controller operably connected to the storage and the communication interface, the controller configured to:
control the communication interface to receive a PCC rule change request from a core server storing data;
generate a PCC rule, in response to the PCC rule change request, for controlling charging for the data; and
control the communication interface to transmit information on the generated PCC rule to a policy enforcer, wherein a caching operation request for the data is transmitted from an access server storing the data to the core server before the PCC rule change request is transmitted from the core server to the policy controller, and wherein the data is charged by the policy enforcer based on volume information included in a label packet which is generated by the core server, and wherein the core server transmits a label packet including identifying information and volume information of the data to the access server via the policy enforcer, and wherein the access server transmit the data to a terminal based on the transmitted label packet.

* * * * *